US007934165B2

(12) United States Patent
Corona (10) Patent No.: US 7,934,165 B2
(45) Date of Patent: Apr. 26, 2011

(54) SYSTEM AND METHOD FOR DRAG-AND-DROP WORKFLOW EDITING IN A MULTIFUNCTION PERIPHERAL (MFP)

(75) Inventor: Fatima Corona, Long Beach, CA (US)

(73) Assignee: Samsung Electronics Co., Ltd., Sunwon, Gyeonggi-Do (KR)

( * ) Notice: Subject to any disclaimer, the term of this patent is extended or adjusted under 35 U.S.C. 154(b) by 812 days.

(21) Appl. No.: 11/924,119

(22) Filed: Oct. 25, 2007

(65) Prior Publication Data
US 2009/0113329 A1 Apr. 30, 2009

(51) Int. Cl.
*G06F 3/048* (2006.01)
*G06F 15/16* (2006.01)
(52) U.S. Cl. .......... 715/769; 715/763; 715/835; 700/86; 717/109
(58) Field of Classification Search .................. 715/700, 715/762, 763, 764, 765, 781, 835, 967, 769, 715/810; 700/11, 17, 18, 83, 86; 717/106, 109
See application file for complete search history.

(56) References Cited

U.S. PATENT DOCUMENTS

| | | | | |
|---|---|---|---|---|
| 5,485,175 A * | 1/1996 | Suzuki | ............................ | 715/841 |
| 6,931,288 B1 * | 8/2005 | Lee et al. | ......................... | 700/86 |
| 7,200,448 B2 * | 4/2007 | Cachat et al. | .................... | 700/18 |
| 7,281,049 B2 * | 10/2007 | Verma et al. | .................. | 709/229 |
| 7,533,355 B2 * | 5/2009 | Aritomi | ........................ | 715/853 |
| 2005/0097472 A1 * | 5/2005 | Machida | ........................ | 715/736 |
| 2006/0259499 A1 * | 11/2006 | Moulckers et al. | ........... | 707/100 |
| 2007/0277116 A1 * | 11/2007 | Nakajima | ...................... | 715/771 |
| 2009/0006992 A1 * | 1/2009 | Gilboa | .......................... | 715/763 |

* cited by examiner

*Primary Examiner* — Xiomar Bautista (57) ABSTRACT

The invention relates to a drag-and-drop workflow editor associated with a multifunction peripheral (MFP). In one embodiment, a drag-and-drop workflow allows a user to define multiple source, transformation, and destination processes in a graphical, drag-and-drop workflow editor. In some embodiments, the source processes may be dynamic processes that are executed at different times.

27 Claims, 11 Drawing Sheets

FIG. 11 ered by the MFP; providing a graphical workspace in
SYSTEM AND METHOD FOR DRAG-AND-DROP WORKFLOW EDITING IN A MULTIFUNCTION PERIPHERAL (MFP)

BACKGROUND OF THE INVENTION

1. Field of the Invention

The invention relates to multifunction peripherals (MFPs). More particularly, the invention relates to a drag-and-drop workflow editor associated with a multifunction peripheral (MFP).

2. Description of the Related Art

Presently, many workflow editors are based on program instructions. In other words, users programmatically write instructions to create and modify workflows. This can be cumbersome for users because most workflow instructions require technical knowledge and/or a programming language in order to be created or modified. Workflows can also be very complex, designed to utilize multiple processes and allowing parallel execution for the stages of a workflow. Hence, there is a need to improve workflow editors to more easily accommodate complex workflows with multiple processes being executed in parallel.

SUMMARY OF CERTAIN INVENTIVE ASPECTS

In general, aspects of the invention relate to multifunction peripherals (MFPs). Specifically, embodiments of the invention relate to a drag-and-drop workflow editor in MFPs.

One aspect is a method of defining a workflow using a drag-and-drop workflow editor associated with a multi-function peripheral (MFP), the method comprising arranging a plurality of source process icons in a graphical workspace, the plurality of source process icons corresponding to a plurality of source processes from which digital information may be received by the MFP; arranging a plurality of destination process icons in the graphical workspace, the plurality of destination process icons corresponding to a plurality of destination processes to which digital information may be sent by the MFP; and defining as a workflow the plurality of source process icons and the plurality of destination process icons arranged in the graphical workspace; wherein the workflow specifies that digital information received from the plurality of source processes corresponding to the plurality of source process icons is sent to the plurality of destination processes corresponding to the plurality of destination process icons, and wherein the workflow is characterized by at least one of the following: multiple ones of the plurality of source processes and multiple ones of the plurality of destination processes.

Another aspect is a multi-function peripheral (MFP) system with a drag-and-drop workflow editor, the system comprising an MFP device comprising at least one input module corresponding to one or more input functions; and at least one output module corresponding to one or more output functions. The system further comprising a drag-and-drop workflow editor module configured to allow users to define a workflow comprising a plurality of source processes corresponding, respectively, to selected ones of the one or more input functions; and a plurality of destination processes corresponding, respectively, to selected ones of the one or more output functions; wherein the workflow specifies that digital information received from the plurality of source processes is sent to the plurality of destination processes, and wherein the workflow is characterized by at least one of the following: multiple ones of the plurality of source processes or multiple ones of the plurality of destination processes.

Yet another aspect is a computer readable medium having instructions stored thereon for allowing users to define a workflow using a drag-and-drop workflow editor associated with a multi-function peripheral (MFP), the instructions comprising providing a plurality of source process icons corresponding to a plurality of source processes from which digital information may be received by the MFP; providing a plurality of destination process icons corresponding to a plurality of destination processes to which digital information may be sent by the MFP; and providing a graphical workspace in which a user may define a workflow by arranging selected ones of the plurality of source process icons and selected ones of the plurality of destination process icons; wherein the workflow specifies that digital information received from the plurality of source processes corresponding to the selected ones of the plurality of source process icons is sent to the plurality of destination processes corresponding to the selected ones of the plurality of destination process icons, and wherein the workflow is characterized by at least one of the following: multiple ones of the plurality of source processes and multiple ones of the plurality of destination processes.

DETAILED DESCRIPTION OF CERTAIN INVENTIVE EMBODIMENTS

Various aspects and features of the invention will become more fully apparent from the following description and the pending claims taken in conjunction with the foregoing drawings. In the drawings, like reference numerals indicate identical or functionally similar elements. The drawings, associated descriptions, and specific implementations are provided to illustrate the embodiments of the invention and not to limit the scope of the disclosure.

In general, the invention relates to methods, systems, and software for implementing a drag-and-drop workflow editor in a multifunction peripheral (MFP). Embodiments of the invention are directed to providing users the ability to construct business workflows in an "easy to create" manner. This may include dragging process icons onto a work area from a process toolbar, thereby constructing a flow diagram which specifies the order in which processes should be executed as it applies to a digital document. The systems, methods, and software proposed here may allow for multiple types of process icons to be dragged onto a workspace area for each group in a toolbar, including multiple icons of the same type. This allows for the freedom to drag-and-drop multiple processes from each group, regardless if they are the same type of process icons or different types of process icons. One advantage of the proposed invention is that users do not need technical knowledge in order to create or modify a workflow. Instead, they can use drag-and-drop techniques in order to create their workflows. All that may be required is the dragging and dropping of icons from a toolbar to a workspace area. In some embodiments, users may define dynamic workflows, which allow users to specify polling intervals during which a workflow process is initiated.

In general, an MFP device is a single integrated device configured to perform two or more functions, including, without limitation, scanning, copying, printing, faxing, combinations of the same, and the like. The functionality of an MFP device may be accessed over a network, including, for example, the Internet, or a LAN, or at the device itself. An MFP device may be configured with sufficient memory to queue jobs waiting to be processed. It will be appreciated that MFP devices may be configured to perform in a variety of different network and standalone computing environments. Although some of the embodiments described herein relate to an MFP device, other embodiments may be implemented with other peripheral devices, such as single-function devices, including for example printers and scanners. To execute its functionality, an MFP device may utilize one or more modules that manage one or more functions. For example, an MFP device may utilize a scanning module that manages the scanning function of an MFP with a scanner. In some embodiments, a single module may manage several MFP functions. Certain modules may be made available to an MFP via Web services. For example, a drag-and-drop workflow editor module may be made available via a Web service.

The word module refers to logic embodied in hardware or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Moreover, although in some embodiments a module may be separately compiled, in other embodiments a module may represent a subset of instructions of a separately compiled program, and may not have an interface available to other logical program units.

In one embodiment, a workflow is a compilation of decisions, steps, and information paths taken in creating and/or outputting a digital document. In one embodiment, a process is a decision, a step, or an information path.

Figure 1:
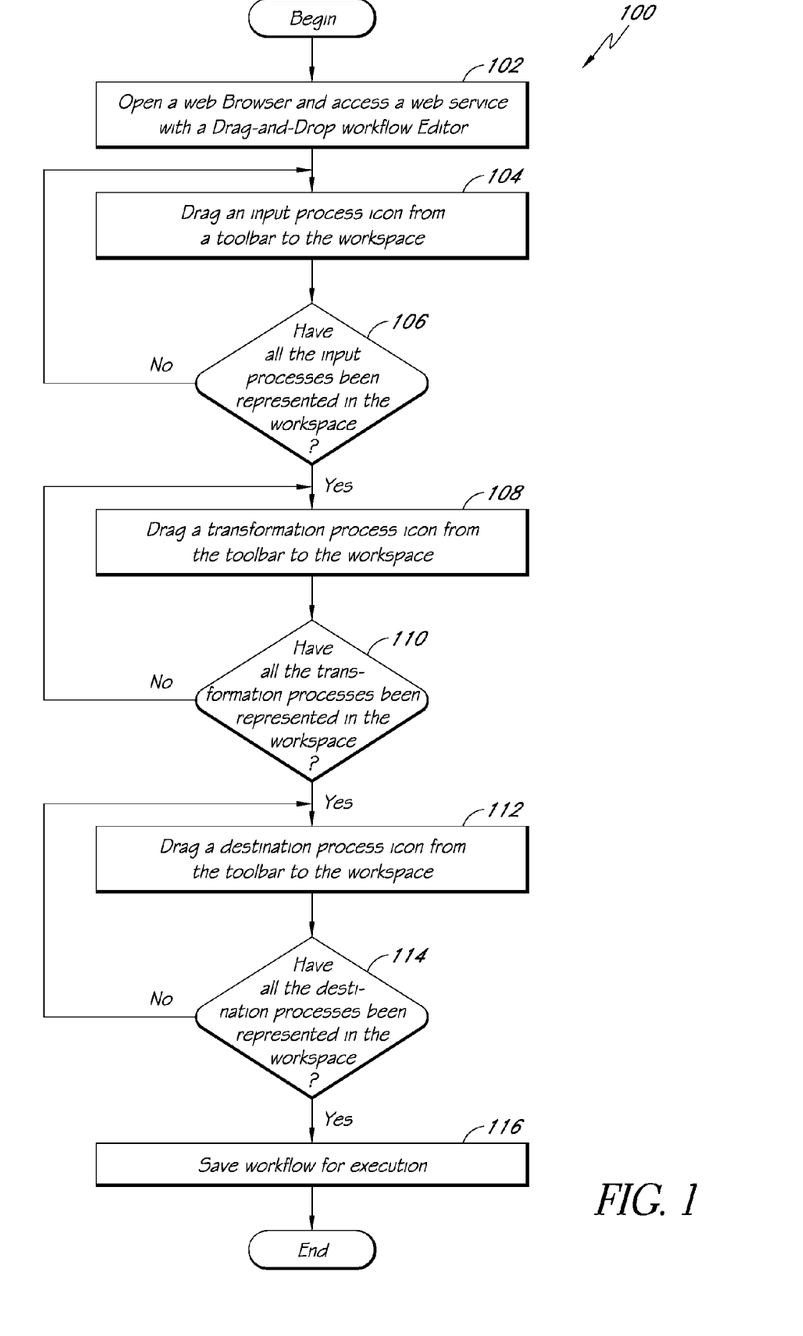
FIG. 1 illustrates one embodiment of a method to use a drag-and-drop workflow editor to create a workflow.

FIG. 1 illustrates one embodiment of a method to use a drag-and-drop workflow editor to create a workflow. In state 102, a user opens a Web browser and accesses a Web service that includes a drag-and-drop workflow editor. In state 104, a user drags an input process icon from a toolbar in the drag-and-drop workflow editor to the current workspace. In state 106, the user determines whether all of the input processes have been represented in the workspace. If all of the input processes have been represented in the workspace, the user proceeds to state 108. If all of the input processes have not been represented in the workspace, the user proceeds to state 104, and repeats the states above, dragging another input process icon from the toolbar to the workspace. In state 108, the user drags a transformation process icon from the toolbar to the workspace. In state 110, the user determines whether all of the transformation processes have been represented in the workspace. If all of the transformation processes have been represented in the workspace, the user proceeds to state 112. If all of the transformation processes have not been represented in the workspace, then the user proceeds to state 108, and repeats the states above, dragging another transformation process icon from the toolbar to the workspace. In state 112, the user drags a destination process icon from the toolbar to the workspace. In state 114, the user determines whether all the destination processes have been represented in the workspace. If all the destination processes have been represented, the user proceeds to state 116. If all of the destination processes have not been represented, then the user proceeds to state 112, and repeats the states above, dragging another destination process icon from the toolbar. In state 116, the user saves the workflow for execution at a later time. In some embodiments, a drag-and-drop workflow editor may be implemented as a Web service module. In other embodiments, a drag-and-drop workflow editor may be implemented as an embedded module in an MFP device itself.

In general, the source processes correspond to input functions of an MFP. The source processes for a drag-and-drop workflow editor may include, for example, the following: scan, fax, email, and folder. A scan source process may correspond to a scanning functionality of an MFP. When a user operates the scanner on an MFP, the MFP generates an image document. A workflow may specify that a scanned document is distributed to a list of destinations. A fax source process may correspond to a faxing functionality of an MFP. When an MFP receives an incoming fax, the MFP generates an image document. A workflow may specify that a received fax document is distributed to a list of destinations. An email source process may correspond to an email function of an MFP. An MFP may be configured to monitor an email address to which it has access, including an email address specific to the MFP. A workflow may specify that an email received at a monitored email address is distributed to a list of destinations. A folder source process may correspond to a folder function of an MFP. An MFP may be configured to monitor a particular file folder to which it has access, including a folder specific to the MFP. A workflow may specify that a folder saved into a monitored folder is distributed to a list of destinations.

In general, the destination processes correspond to output functions of an MFP. The destination processes for a drag-and-drop workflow editor may include, for example, the following: email, file transfer protocol (FTP), fax, folder, and printer. An email destination process may correspond to an email function of an MFP. To deliver data to an email address, an MFP may use an email client to attach the data to (or, possibly, imbed the data in) an email message that the MFP creates and sends through the Internet. An FTP destination process may correspond to an FTP function of an MFP. To deliver data to an FTP address, an MFP may use an FTP client to transfer data via the Internet to a recipient location via the File Transfer Protocol. A fax destination process may correspond to a faxing function of an MFP. To deliver data to a fax address, an MFP may use a fax client to send the data over a telephone line to a fax address. A folder destination process may correspond to a folder function of an MFP. To deliver data to a folder address, an MFP may have access to a folder, and may be configured to save data in the folder address. A printer destination process may correspond to a printing function of an MFP. To deliver data via a printing function, an MFP may use its native printer to print the data.

In general, the transformation processes correspond to transformation functions of an MFP. The transformation processes for a drag-and-drop workflow editor may include, for example, the following: optical character recognition (OCR). An OCR transformation process may correspond to an OCR function of an MFP. To transform an image to a text document with character, an MFP may use an OCR client to analyze an image, recognize any text characters, and create a text document.

Figure 2:
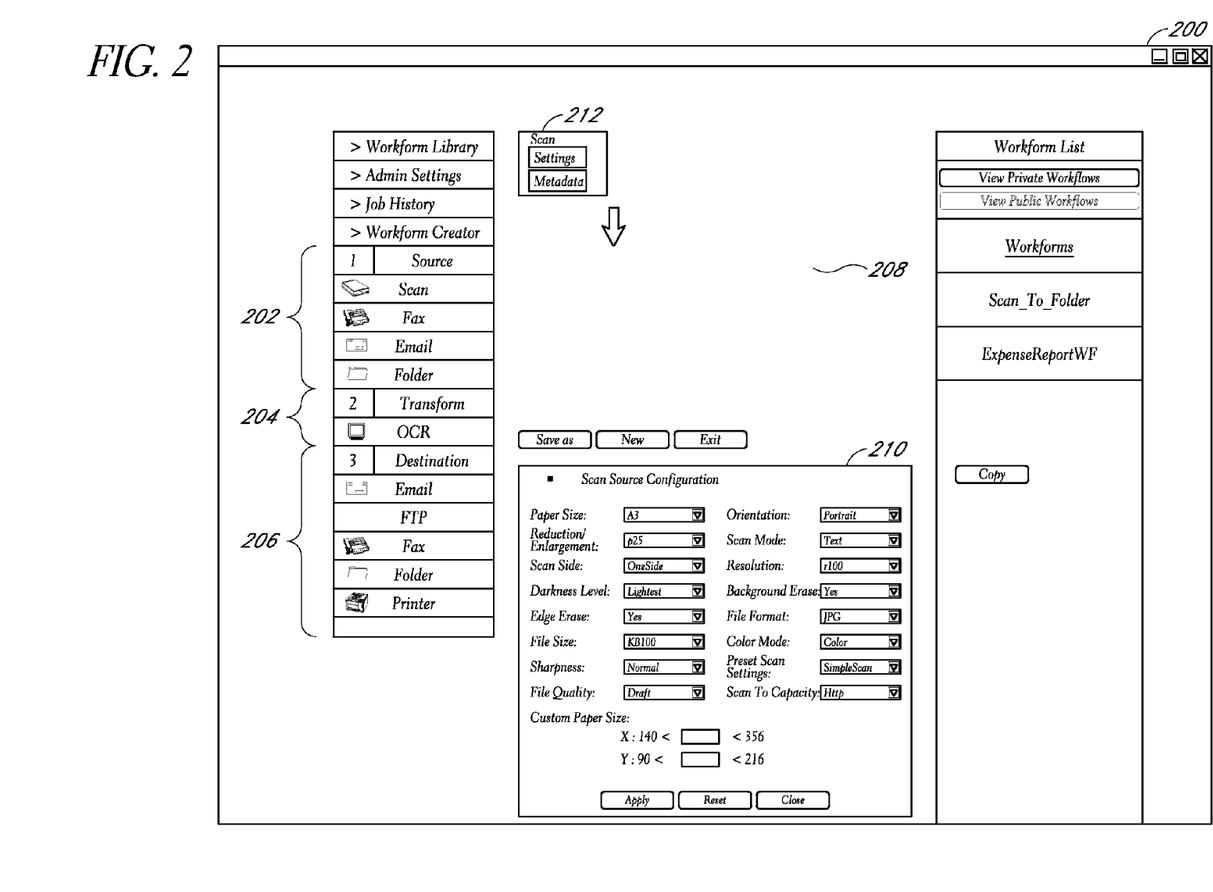
FIG. 2 illustrates a drag-and-drop workflow editor comprising a scan process with the illustrated configuration settings.

FIG. 2 illustrates a drag-and-drop workflow editor comprising a scan process with the illustrated configuration settings. Workflow editor 200 includes process toolbars 202, 204, and 206, a workspace 208, and configuration settings window 210, which are described in greater detail below. Workflow editor 200 also includes several interface features not described in greater detail below, including the buttons on the right-hand side of the display, which relate to the display of private and public workflows defined by a user. In the embodiment illustrated in FIG. 2, there are buttons to alternate between viewing the private and public workflows (a user has selected to view the public workflows). The public workflows currently saved in the program are the "Scan_To_Folder" and the "ExpenseReportWF" workflows. There is also a button that allows a user to copy the settings from an already created workflow, and to create another workflow with the same settings. Those of skill in the art will appreciate that there are many suitable ways to provide a user with the organization and display of workflows already defined.

Workflow editor 200 includes process icons for source processes, transformation processes, and destination processes. For example, the source process toolbar 202 includes icons for the following source processes: Scan, Fax, Email, and Folder. Workflow toolbar 202 also includes an icon for the following transformation process: optical character recognition (OCR). Workflow toolbar 202 also includes the following icons for destination processes: Email, FTP, Fax, Folder, and Printer.

Workspace 208 is an area in the workflow editor 200 where a user may drag process icons to arrange them into workflows. In FIG. 2, a user has dragged a scan source process icon 212 to the workspace 208. An arrow indicates the direction of the flow of information. At the bottom of the workspace 208, there are buttons for saving the current workflow defined in the workspace, for creating a new workflow in the workspace, and for exiting the program.

Configuration settings window 210 includes the settings for a particular process corresponding to the selected process icon. For example, in FIG. 2, the configuration settings window 210 displays the configuration settings for the scan source process icon 212. The configuration settings for the scan source process include the following: Paper Size, Reduction/Enlargement, Scan Side, Darkness Level, Edge Erase, File Size, Sharpness, File Quality, Custom Paper Size, Orientation, Scan Mode, Resolution, Background Erase, File Format, Color Mode, Preset Scan Settings, Scan To Capacity, and Custom Paper Size (in both X and Y axes). By selecting one of the buttons at the bottom of the configuration settings display 210, the user may apply these settings, reset the settings, or close the configuration settings window 210.

Figure 7:
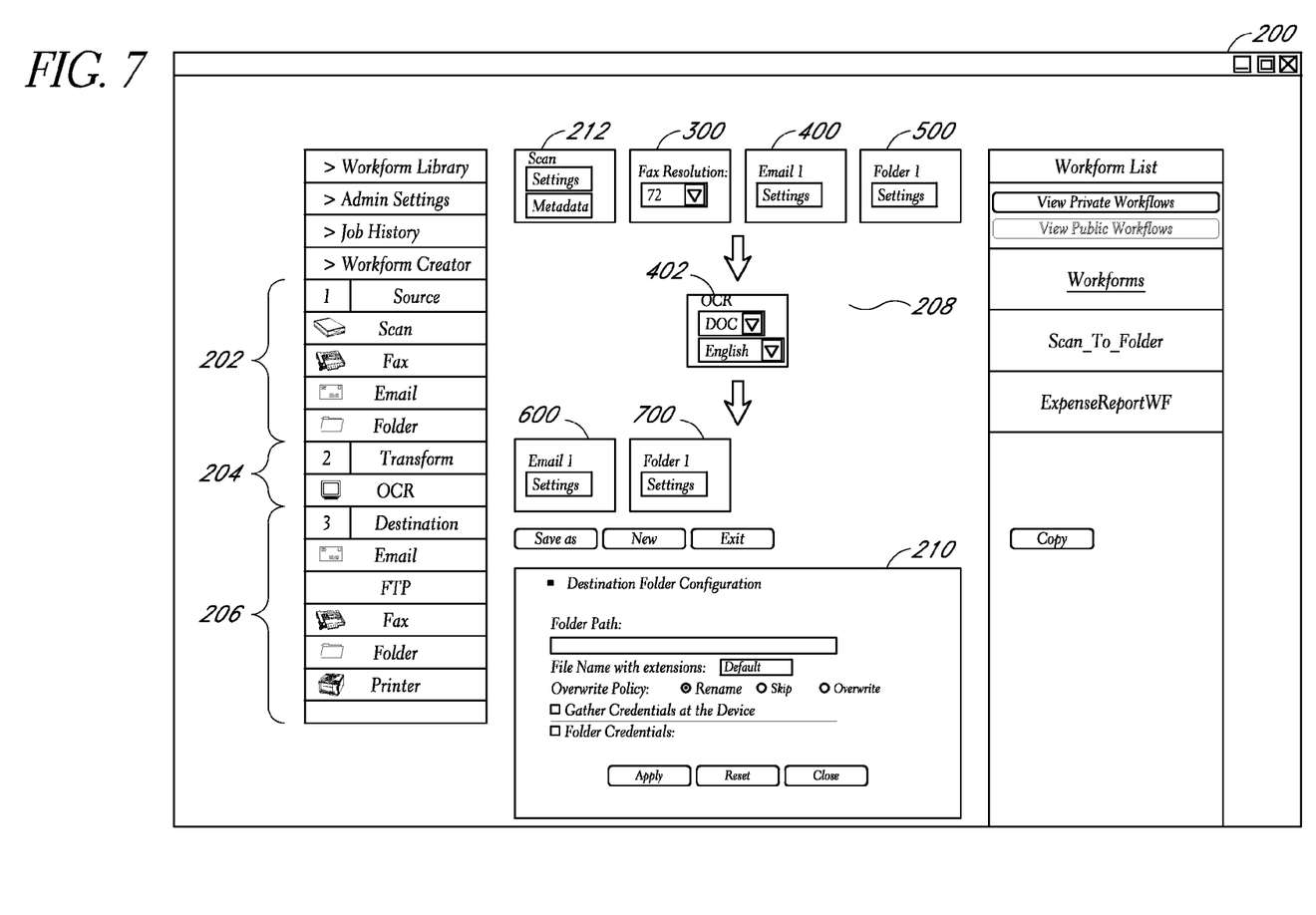
FIG. 7 illustrates a drag-and-drop workflow editor comprising a destination folder process that has the illustrated configuration settings.
Figure 8:
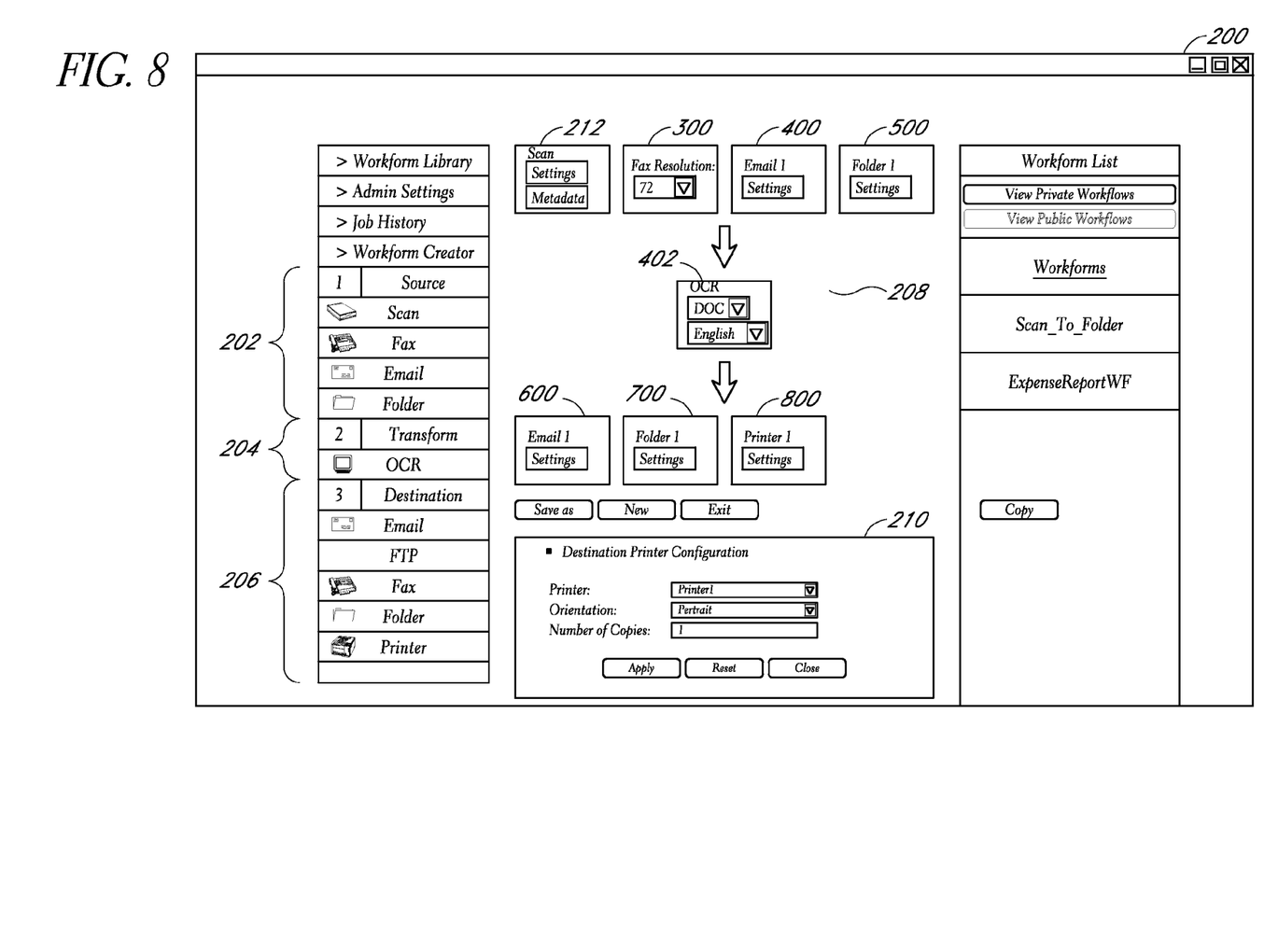
FIG. 8 illustrates a drag-and-drop workflow editor comprising a destination printer process that has the illustrated configuration settings.
Figure 9:
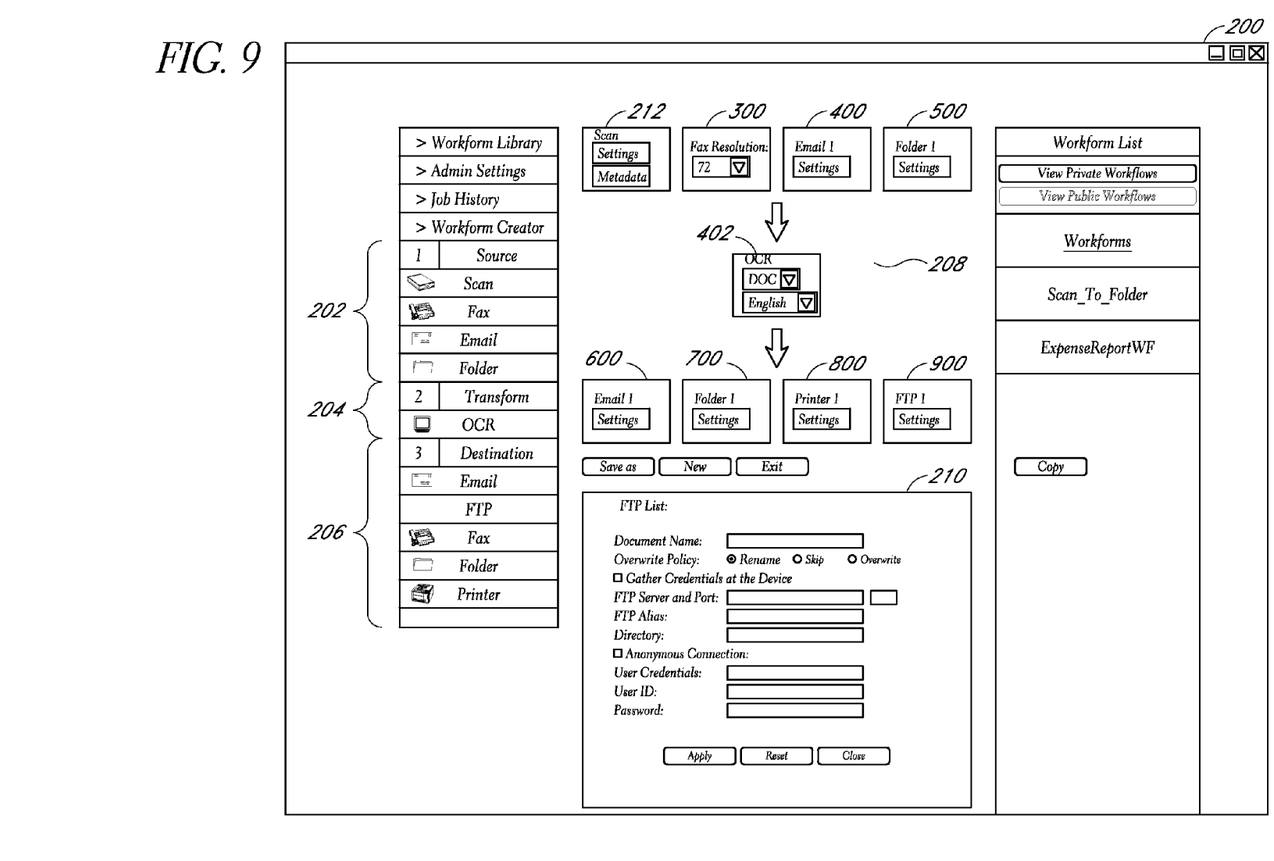
FIG. 9 illustrates a drag-and-drop workflow editor comprising a destination FTP process that has the illustrated configuration settings.

FIGS. 3, 4, 5, 6, 7, 8, and 9 illustrate the gradual creation of a graphical workflow, as a user drags source process icons, transformation process icons, and destination process icons to the workspace 208. The destination icons are arranged at the top of the workspace 208. The destination icons are arranged at the bottom of the workspace 208. The transformation icons are placed in-between them. The arrows between the icons demonstrate the direction of the flow of digital information through the workflow. FIG. 9 illustrates the final user-defined workflow. This workflow includes four source processes, including the scan, fax, email, and folder processes. In other words, the user-defined workflow takes digital information provided from a scanner, a fax, an email message, and a shared folder, and then sends that digital information through a transformation process. In the illustrated example, the transformation process is the OCR process. Thus, the digital information captured from the scanner is transformed by the OCR transformation process into an English document of type "DOC". Similarly, the digital information captured from the fax, email message, and shared folder is also transformed into English documents of the type "DOC". These transformed documents are then sent to four different destination processes, including, as illustrated, an email message, a shared folder, a printer, and an FTP site. The settings for the source, transformation, and destination processes determine the particular operations of each individual process. These particular settings are described in greater detail below with reference to the respective figure that includes the configuration settings for the most recently added icon.

Although the illustrated embodiment described below includes at least a source process, a transformation process, and a destination process, in other embodiments, a workflow may comprise for example a source process and a destination process, without including a transformation process.

Figure 3:
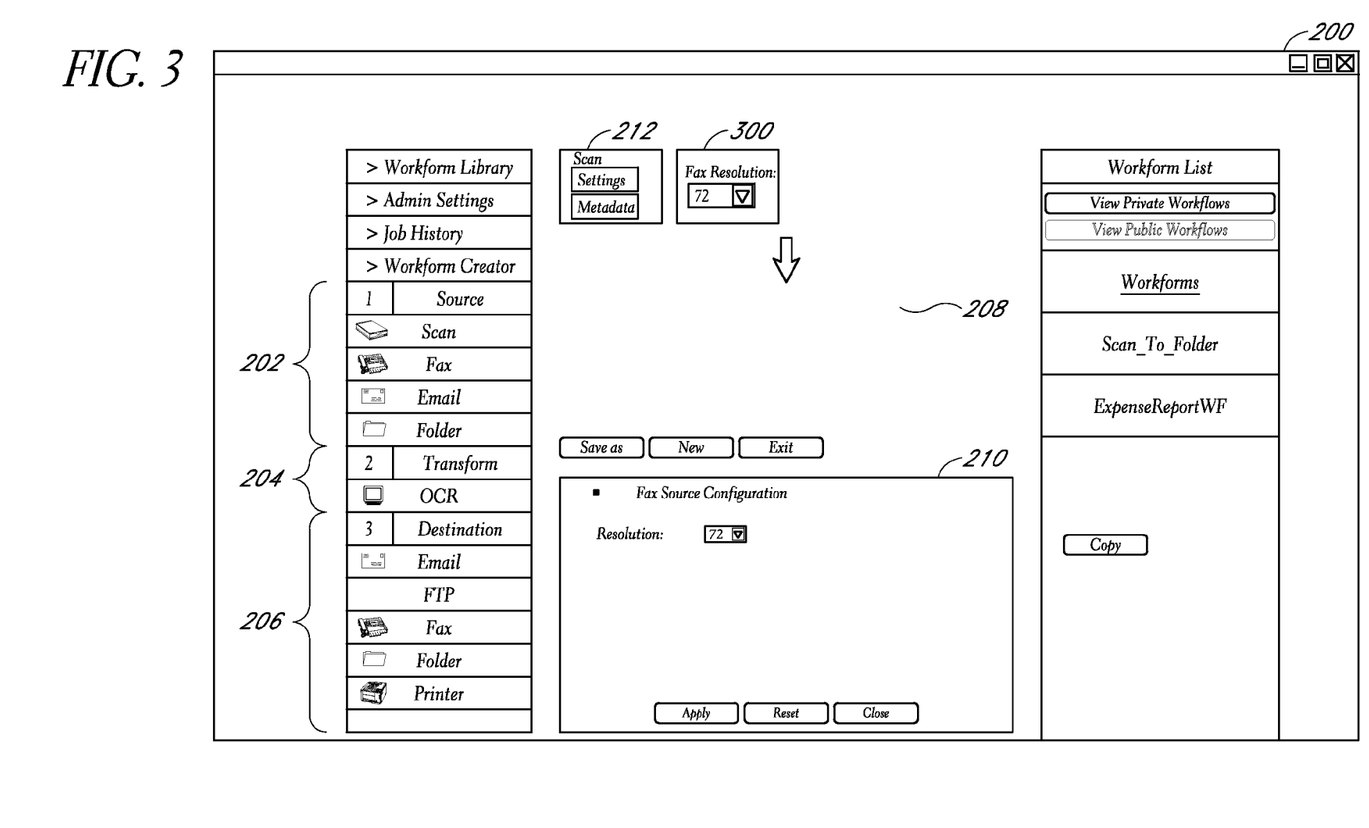
FIG. 3 illustrates a drag-and-drop workflow editor with a fax process that has the illustrated configuration settings.

FIG. 3 illustrates the addition of the fax source process to the workflow, initiated by the dragging of fax source process icon 300 to the workspace 208. The fax source process includes a single configuration setting, the resolution setting. The user has set the resolution to "72".

Figure 4:
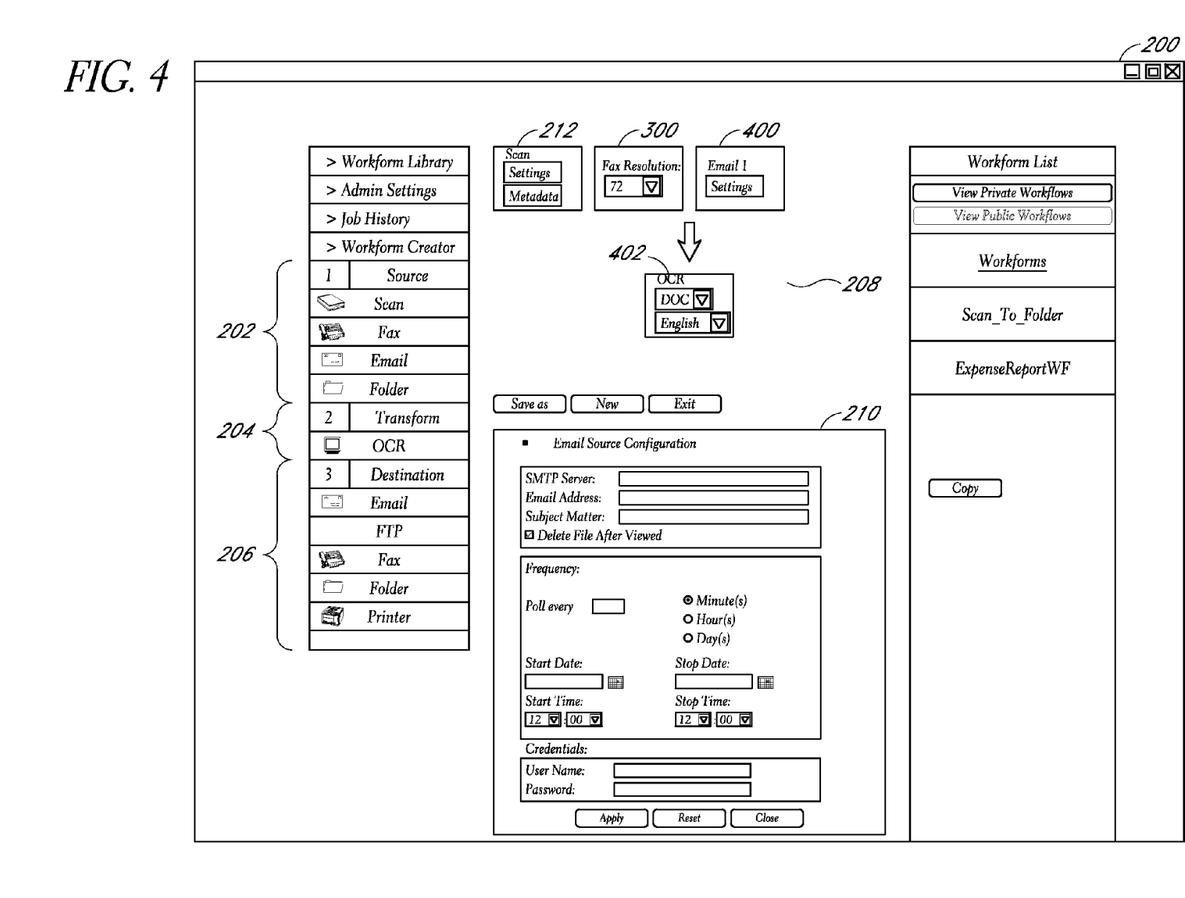
FIG. 4 illustrates a drag-and-drop workflow editor with an e-mail process that has the illustrated configuration settings.

FIG. 4 illustrates the addition of an email source process to the workflow, initiated by the dragging of an email source process icon 400 to the workspace 208. The email source process may be configured with various configuration settings. A user may define the SMTP server from which to receive email messages. A user may also specify an email address from which to receive the messages, as well as a subject filter for filtering the email messages to be received. There is also an option for deleting the email message after it has been viewed. In some embodiments, an email source may define a dynamic component of the workflow. Thus, in the illustrated embodiment, the user may elect to poll for email messages at a specified frequency. The user may select a polling frequency based on minutes, hours, or days. The user may also set a start date and time, as well as a stop date and time. The user may also enter a user name and password for accessing the email account. Dynamic workflows are described in greater detail below with reference to FIGS. 10 and 11.

FIG. 4 also illustrates the addition of an OCR transformation process to the workflow, initiated by the dragging of an OCR transformation process icon 402 to the workspace 208. The configuration settings for the OCR transformation process specify the type of document and the language. In the example, the user has specified that the OCR transformation process should transform the digital information received from the source Processes into documents of the type "DOC" and into the language of "English".

Figure 5:
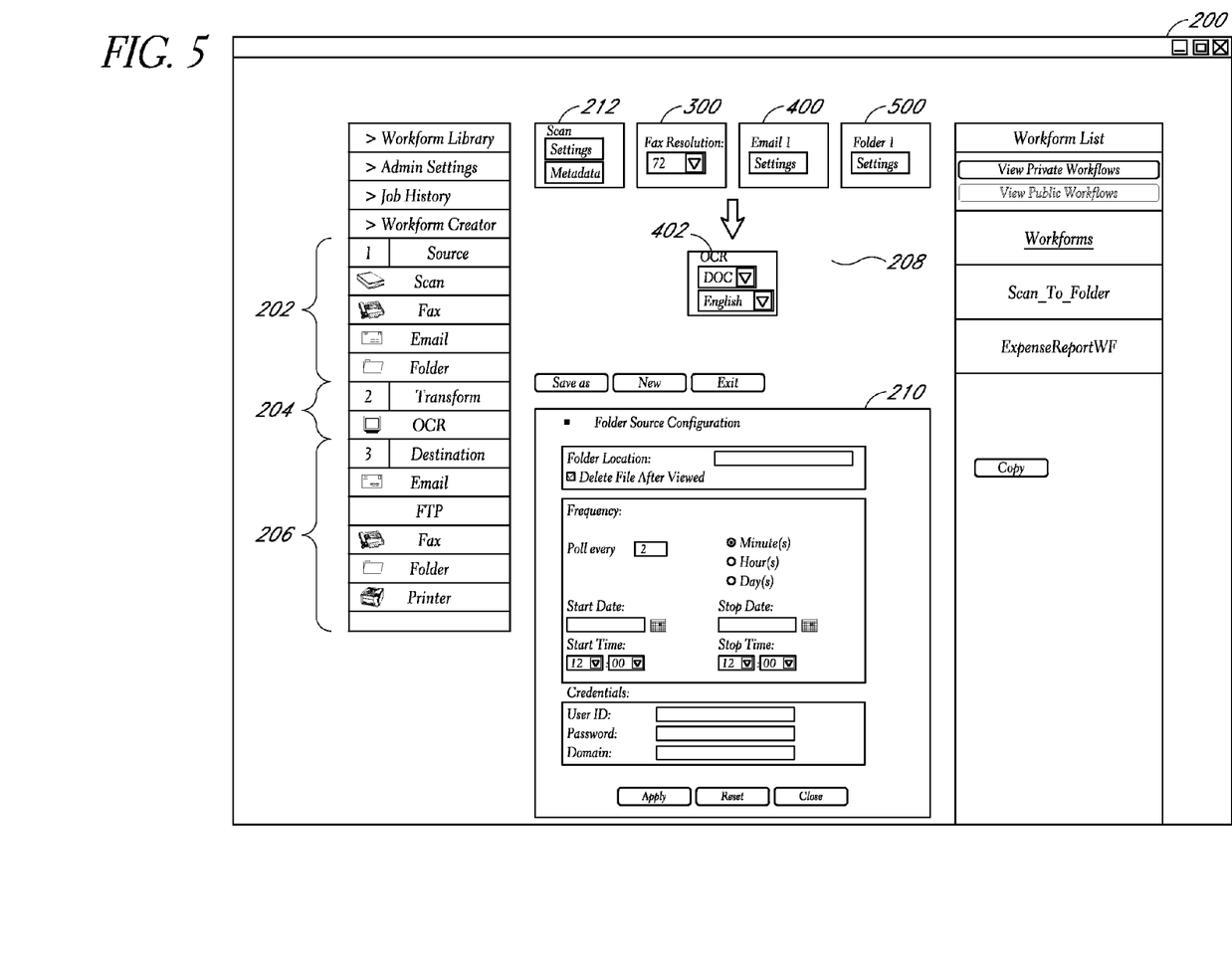
FIG. 5 illustrates a drag-and-drop workflow editor comprising a folder process that has the illustrated configuration settings.

FIG. 5 illustrates the addition of a shared folder source process to the workflow, initiated by the dragging of a shared folder source process icon 500 to workspace 208. The configuration settings for the shared folder source process include a setting to specify the folder location, as well as an option to delete the file after it has been viewed. Similar to the email configuration settings described above with reference to FIG. 4, the shared folder process may also be a dynamic component. Thus, the corresponding configuration settings allow a user to specify a polling frequency. A user may also supply a user ID, a password, and a domain to give credentials for the accessing of the shared folder. Dynamic workflows are described in greater detail below with reference to FIGS. 10 and 11.

Figure 6:
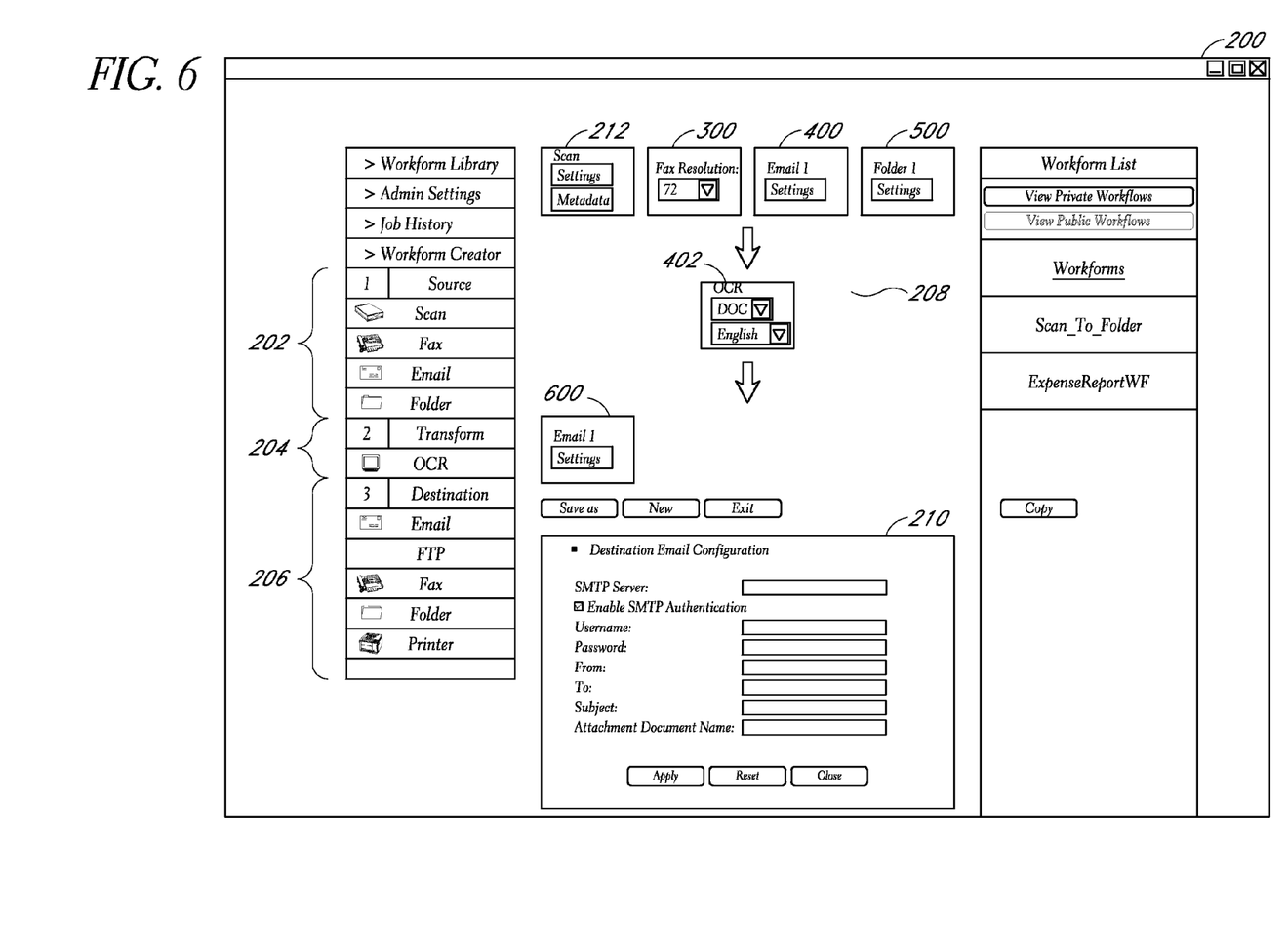
FIG. 6 illustrates a drag-and-drop workflow editor comprising an OCR process and a destination e-mail process that have the illustrated configuration settings.

FIG. 6 illustrates the addition of an email destination process to the workflow, initiated by the dragging of the email destination process icon 600 to the workspace 208. The email destination process has some of the same configuration settings as the source email process. In the illustrated destination email process, however, there are no configuration settings for polling, as the destination process takes whatever suitable information is provided by either the source processes or the transformation process and delivers it to the specified destination. Thus, the destination email configuration settings include a specified SMTP server, as well as an option to enable SMTP authentication. Additionally, the destination email configuration settings include a user name, password, from line, to line, subject line, and a name for sending the document as an attachment.

FIG. 7 illustrates the addition of a destination shared folder process to the workflow, initiated by the dragging of the shared folder process icon 700 to the workspace 208. The corresponding destination shared folder process has configuration settings to specify a folder path as well as a file name extension. The user may also specify an overwrite policy prompting the user to rename the document, to skip the writing of the document, or to overwrite the document. Furthermore, the user has options to gather credentials at the device or to specify the folder credentials. For example, if a user chooses a "scan" input, then access credentials (for sending to a folder, for example) may be gathered at the device at the time of the scan. Alternatively, a user may specify the credentials when a workform is defined. When a particular workflow is executed, the credentials may be retrieved for access. Typically, dynamic workflows retrieve credentials from their respective saved workforms.

FIG. 8 illustrates the addition of a destination printer process to the workflow, initiated by the dragging of the destination printer process icon 800 to the workspace 208. The illustrated destination printer process has configuration settings to specify the printer, the orientation of the paper, and the number of copies.

FIG. 9 illustrates the addition of a destination FTP process to the workflow, initiated by the dragging of the destination FTP process icon to the workspace 208. The illustrated corresponding destination FTP process includes configuration settings to allow the user to name the document, to set an overwrite policy to rename the file, to skip the writing of the file, or to overwrite the file in the case of an identical name. The user may also specify whether to gather credentials at the device. The user may specify an FTP server and port, as well as an FTP alias and directory. The user may also specify for an anonymous connection, and provide user credentials, a user ID, and password.

Figure 10:
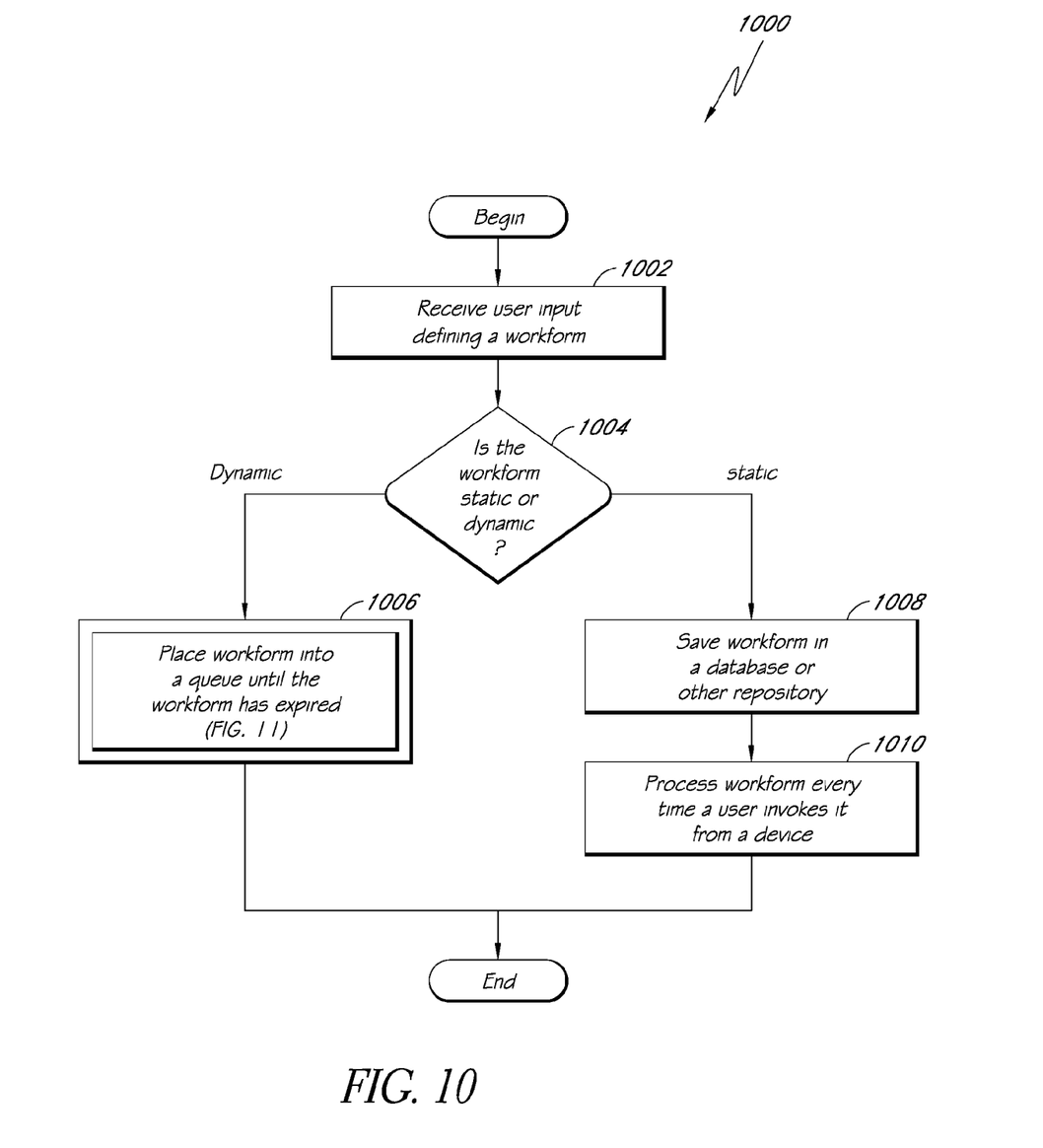
FIG. 10 illustrates one embodiment of a method to implement static and dynamic work flows.
Figure 11:
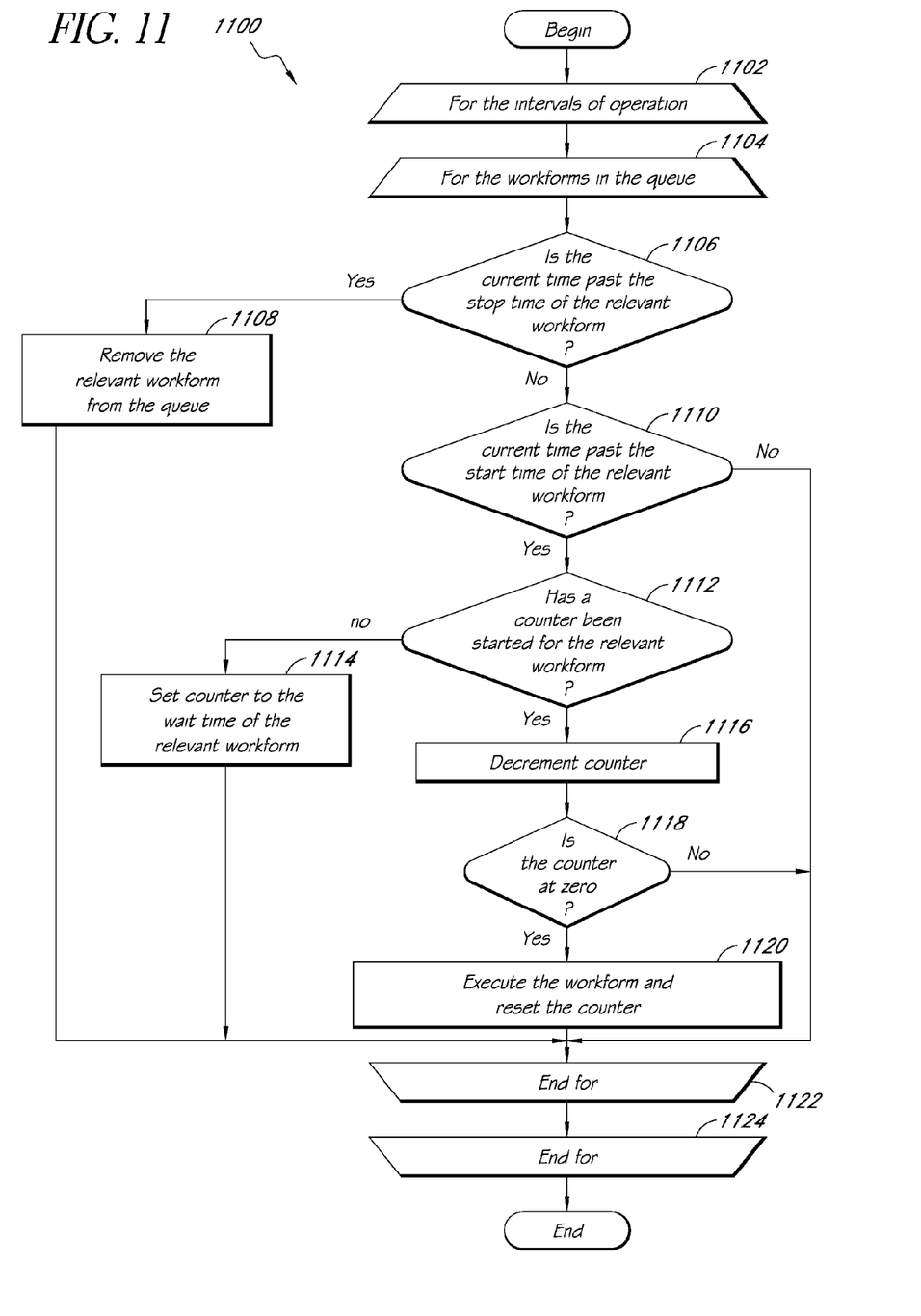
FIG. 11 illustrates one embodiment of a method to implement dynamic work flows.

FIGS. 10 and 11 illustrate flowcharts of one embodiment to implement static and dynamic processes of workflows. As described above with reference to FIGS. 4 and 5, in some embodiments, it is possible for the user to include dynamic processes into a particular workflow. A dynamic process executes at a specified interval. Some dynamic processes execute by determining whether there are any inputs available at the specified interval. If there are inputs available, the dynamic process performs the operations specified by the workflow, such as transforming the input, and distributing the transformed information to a destination process. Other dynamic processes may not need to determine whether there are any inputs available, but may instead gather available inputs at the specified interval and execute the remainder of the workflow. In the illustrated embodiment, static and dynamic processes may be included in a single workflow.

FIG. 10 illustrates a top-level flowchart of implementing dynamic and static processes of workflows. In state 1002, the workflow module 1000 receives user input defining a workflow process. In state 1004, the workflow module 1000 determines whether the workflow process is static or dynamic. If the workflow process is dynamic, then in state 1006, the module places the workflow process into a queue until the workflow process has expired. This operation is described in greater detail below with reference to FIG. 11. If the workflow process is static, then in state 1008, the workflow module 1000 saves the workflow process in a database or other repository. Then, in state 1010, the workflow module 1000 processes the workflow process every time a user invokes it from a device.

FIG. 11 illustrates one embodiment of a dynamic module 1100 that implements dynamic workflows. The operations between states 1102 and 1124 are executed for the specified intervals of operation of the dynamic module 1100. The interval of operation is a variable that specifies how often the dynamic module 1100 processes the dynamic work forms in the queue. The operations between states 1104 and 1122 are performed for the workflow processes in the queue. In other words, these operations are performed for the dynamic workflow processes that the workflow module 1000 has placed in the queue.

In state 1106, the dynamic module determines whether the current time is past the stop time of the relevant workflow process. If the current time is past, the stop time of the relevant workflow process, the dynamic module 1100 removes the relevant workflow process from the queue, in state 1108. This means that the relevant workflow process (that is, the workflow process being processed by the dynamic module 1100) is no longer being monitored.

If the current time is not past the stop time of the relevant workflow process, then in state 1110, the dynamic module 1100 determines whether the current time is past the start time of the relevant workflow process. If the current time is not past the start time of the relevant workflow process, then that workflow process is not being monitored at that time, and none of the monitoring operations are performed on it.

If the current time is past the start time of the relevant workflow process, then in state 1112, the dynamic module 1100 determines whether a counter has been started for the relevant workflow process. The counter is started the first time that the start time of the relevant workflow process has been reached by the current time. In other words, a counter is started when the work form begins to be monitored. If a counter has not been set, then in state 1114, the counter is set to the wait time of the relevant workflow process. The wait time is a variable specifying how often to execute the workflow process. For example, if the wait time is 1 second, then the relevant work form is executed for every second that the workflow process is being monitored. If the counter has already been started for the relevant workflow process, then in state 1116, the counter is decremented by a certain suitable interval. In some embodiments, this interval is the interval of operation.

In state 1118, the dynamic module 1100 determines whether the counter is at zero. If the counter is at zero, then in state 1120, the relevant workflow process is executed and the counter is reset to the wait time of the relevant workflow process. If the counter is not at zero, then it is not time to execute the workflow process and the instructions for the queue loop ends in state 1122. If the relevant workflow process is the last workflow process, then the instructions within the interval loop end in state 1124.

In some embodiments, different source inputs are treated as separate dynamic workforms and are placed in the queue separately. For example, if a workform includes both an Email and a Folder input, then two different dynamic workforms may be placed in the queue (with separate counters, start and stop times, and so forth). The dynamic workforms may both reference the same parent workform, which includes information regarding destinations.

Although this invention has been described in terms of certain embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A method of defining a workflow using a drag-and-drop workflow editor associated with a multi-function peripheral (MFP), the method comprising:
   arranging a plurality of source process icons in a graphical workspace, the plurality of source process icons corresponding to a plurality of source processes, including a shared file folder, from which digital information may be received by the MFP;
   arranging a plurality of destination process icons in the graphical workspace, the plurality of destination process icons corresponding to a plurality of destination processes, including the shared file folder, to which digital information may be sent by the MFP; and
   defining as a workflow the plurality of source process icons and the plurality of destination process icons arranged in the graphical workspace;
   wherein the workflow specifies that digital information received from the plurality of source processes corresponding to the plurality of source process icons is sent to the plurality of destination processes corresponding to the plurality of destination process icons, and wherein the workflow is characterized by at least one of the following: multiple ones of the plurality of source processes and multiple ones of the plurality of destination processes.

2. The method of claim 1, further comprising arranging transformation process icons in the graphical workspace, the transformation process icons corresponding to transformation processes utilized by the MFP to transform digital information, wherein the workflow further specifies that digital information received from the plurality of sources processes corresponding to the plurality of source process icons is transformed by the plurality of transformation processes corresponding to the plurality of transformation process icons before being sent to the plurality of destination processes corresponding to the plurality of destination process icons, and wherein the transformation processes comprise at least one of the following: optical character recognition (OCR).

3. The method of claim 1, wherein the source processes comprise at least one of the following: scan, email, fax, and shared folder.

4. The method of claim 1, wherein the destination processes comprise a file transfer protocol (FTP).

5. The method of claim 1, wherein the plurality of source processes comprises dynamic and static processes.

6. The method of claim 5, further comprising, if a particular source process is static, executing the particular static source process when a user invokes it from the MFP.

7. The method of claim 5, further comprising, if a particular source process is dynamic, placing the particular dynamic source process into a queue until the particular dynamic source process has expired.

8. The method of claim 7, further comprising, at an interval of time, evaluating whether the particular dynamic source process in the queue should be executed at the interval of time.

9. The method medium of claim 1, wherein the plurality of destination processes comprises dynamic and static processes, the dynamic processes execute at a specified interval of time.

10. The method of claim 1, wherein the plurality of destination processes comprises dynamic and static processes, the dynamic processes execute by determining whether any of the source processes are available.

11. A multi-function peripheral (MFP) system with a drag-and-drop workflow editor, the system comprising:
    an MFP device comprising:
    at least one input module corresponding to one or more input functions, including a shared file folder; and
    at least one output module corresponding to one or more output functions, including the shared file folder; and
    a drag-and-drop workflow editor module configured to allow users to define a workflow comprising:
    a plurality of source processes corresponding, respectively, to selected ones of the one or more input functions; and
    a plurality of destination processes corresponding, respectively, to selected ones of the one or more output functions;
    wherein the workflow specifies that digital information received from the plurality of source processes is sent to the plurality of destination processes, and wherein the workflow is characterized by at least one of the following: multiple ones of the plurality of source processes or multiple ones of the plurality of destination processes.

12. The system of claim 11, wherein the drag-and-drop workflow editor module is accessible in at least one of the following implementations: an embedded module and a Web service module.

13. The system of claim 11, the MFP device further comprising at least one transformation module corresponding to one or more transformation functions, and the workflow further comprising a plurality of transformation processes corresponding, respectively, to selected ones of the one or more transformation functions, wherein the one or more transformation functions comprise at least one of the following: optical character recognition (OCR).

14. The system of claim 11, wherein the one or more input functions comprise at least one of the following: scan, email, fax, and shared folder.

15. The system of claim 11, wherein the one or more output functions comprise at least one of the following: print, fax, email, file transfer protocol (FTP), and shared folder.

16. The system of claim 11, wherein the plurality of source processes comprises dynamic and static processes.

17. The system of claim 16, the drag-and-drop module further configured, if a particular source process is static, to execute the particular static source process when a user invokes it from the MFP.

18. The system of claim 16, the drag-and-drop module further configured, if a particular source process is dynamic, to place the particular dynamic workflow process into a queue until the particular dynamic source process has expired.

19. The system of claim 18, drag-and-drop workflow module further configured, at an interval of time, to evaluate whether the particular dynamic source process in the queue should be executed at the interval of time.

20. A computer readable medium having instructions stored thereon for allowing users to define a workflow using a drag-and-drop workflow editor associated with a multifunction peripheral (MFP), the instructions comprising:
providing a plurality of source process icons corresponding to a plurality of source processes, including a shared file folder, from which digital information may be received by the MFP;
providing a plurality of destination process icons corresponding to a plurality of destination processes, including the shared file folder, to which digital information may be sent by the MFP; and
providing a graphical workspace in which a user may define a workflow by arranging selected ones of the plurality of source process icons and selected ones of the plurality of destination process icons;
wherein the workflow specifies that digital information received from the plurality of source processes corresponding to the selected ones of the plurality of source process icons is sent to the plurality of destination processes corresponding to the selected ones of the plurality of destination process icons, and wherein the workflow is characterized by at least one of the following: multiple ones of the plurality of source processes and multiple ones of the plurality of destination processes.

21. The computer-readable medium of claim 20, the instructions further comprising providing transformation process icons corresponding to transformation processes utilized by the MFP to transform digital information, wherein providing a graphical workspace comprises providing a graphical workspace in which a user may define a workflow by also arranging selected ones of the plurality of transformation process icons, wherein the workflow further specifies that digital information received from the plurality of sources processes corresponding to the selected ones of the plurality of source process icons is transformed by the plurality of transformation processes corresponding to the selected ones of the plurality of transformation process icons before being sent to the plurality of destination processes corresponding to the plurality of destination process icons, and wherein the transformation processes comprise at least one of the following: optical character recognition (OCR).

22. The computer-readable medium of claim 20, wherein the source processes comprise at least one of the following: scan, email, fax, and shared folder.

23. The computer-readable medium of claim 20, wherein the destination processes comprise at least one of the following: print, fax, email, file transfer protocol (FTP), and shared folder.

24. The computer-readable medium of claim 20, wherein the plurality of source processes comprises dynamic and static processes.

25. The computer-readable medium of claim 24, the instructions further comprising, if a particular source process is static, executing the particular static source process when a user invokes it from the MFP.

26. The computer-readable medium of claim 24, the instructions further comprising, if a particular source process is dynamic, placing the particular dynamic source process into a queue until the particular dynamic source process has expired.

27. The computer-readable medium of claim 26, the instructions further comprising, at an interval of time, evaluating whether the particular dynamic source process in the queue should be executed at the interval of time.

* * * * *